US005480925A

United States Patent [19]
Masuzaki et al.

[11] Patent Number: 5,480,925
[45] Date of Patent: Jan. 2, 1996

[54] SELF-FADING COLOR ADHESIVE

[75] Inventors: Hisao Masuzaki; Shinji Sugii, both of Tokyo, Japan

[73] Assignee: Minnesota Mining and Manufacturing Company, St. Paul, Minn.

[21] Appl. No.: 211,285

[22] PCT Filed: Nov. 6, 1992

[86] PCT No.: PCT/US92/09828

§ 371 Date: Jul. 20, 1994

§ 102(e) Date: Jul. 20, 1994

[87] PCT Pub. No.: WO93/09197

PCT Pub. Date: May 13, 1993

[30] Foreign Application Priority Data

Nov. 8, 1991 [JP] Japan ..................................... 3-293470

[51] Int. Cl.$^6$ ................. C08K 5/13; C08K 5/34
[52] U.S. Cl. ..................... 524/86; 524/242; 524/251; 524/252; 524/259; 524/330; 524/338; 524/341; 524/903; 252/305
[58] Field of Search ................... 524/86, 186, 221, 524/222, 223, 242, 251, 252, 338, 903, 330, 341, 259; 252/305; 428/343, 355

[56] References Cited

U.S. PATENT DOCUMENTS

| | | | |
|---|---|---|---|
| 3,400,095 | 9/1968 | Kremer et al. | 524/571 |
| 3,578,622 | 5/1971 | Brown et al. | 524/464 |
| 3,776,873 | 12/1973 | Kremer | 524/903 |
| 4,598,105 | 7/1986 | Weber et al. | 524/86 |
| 4,994,322 | 2/1991 | Delgado et al. | 428/343 |

FOREIGN PATENT DOCUMENTS 2508653  2/1975  Germany.

OTHER PUBLICATIONS

Precision Valve Specification Sheet.

*Primary Examiner*—Tae H. Yoon
*Attorney, Agent, or Firm*—Gary L. Griswold; Walter N. Kim; Christine T. O'Shaughnessy

[57] ABSTRACT

This invention relates to a sprayable adhesive that, when applied to a substrate, exhibits a color that confirms where it has been applied and then fades upon drying.

5 Claims, No Drawings

SELF-FADING COLOR ADHESIVE

FIELD OF THE INVENTION

This invention relates to an adhesive that, when applied to a substrate, exhibits a color that confirms where it has been applied and then fades upon drying.

BACKGROUND ART

For the purpose of confirming the area coated and the weight of the adhesive applied when adhesives are sprayed, adhesives colored by pigments or dyes have been used. Such adhesives do not fade or change color after spraying and drying, and are consequently undesirable for many applications.

The present invention provides an adhesive, preferably an aerosol adhesive, that, immediately after application, exhibits a color which allows confirmation of the area coated and the weight of the adhesive applied. The color of the adhesive subsequently fades to clear upon drying.

SUMMARY OF THE INVENTION

The present invention relates to a self-fading color adhesive. The self-fading color adhesive shows a color immediately after spraying and said color fades with the passage of time. In general it can be used advantageously where it is desirable to see the portion of the substrate initially treated with adhesive, but where it would be undesirable for the final adhesive to have color. For example, in applications involving thin, clear or lightly colored substrates, it may be undesirable to have the adhesive permanently colored, since the adhesive would permanently distort the color of the substrate.

DETAILED DESCRIPTION OF THE INVENTION

The invention is preferably directed towards incorporating a color changing acid-base indicator into sprayable adhesives. More specifically, the self-fading color adhesive of the present invention comprises the following components: (a) clear or slightly colored organic solvent type adhesive, (b) basic material which readily volatilizes at ambient temperatures, (c) acid-base indictor which is colored in basic environment and turns clear in non-basic environment, and preferably (d) spraying agent.

The invention is not intended to be limited to specific adhesive composition. The non-volatile adhesive components can be selected from a wide variety of adhesive components commonly employed in adhesives including polymers of acrylic esters or partially crosslinked acrylic esters and elastomeric adhesives including partially crosslinked or soluble styrene-butadiene rubber, butyl rubber, thermoplastic block copolymers such as styrene-isoprene-styrene or styrene-butadiene-styrene block copolymers, polychloroprene rubber, natural rubber and butadiene-acrylonitrile rubber. Other classes of adhesives such as polyvinyl chloride, polyvinylacetate, polyvinylalcohol and polyvinylpyrrolidone also form suitable sprayable adhesives. The adhesive can also include tackifiers, such as polyterpene resins and hydrogenated rosin esters. A preferred acrylic ester is a crosslinked isooctyl acrylate and acrylic acid copolymer which can be made by the method described in U.S. Pat. No. 3,578,622, Example 1.

Preferred tackifiers are hydrogenated rosin esters such as Estergum H, available from Arakawa Chemical Co., Ltd., and Pentalyn H and Foral 105 both available from Hercules Co. Other suitable tackifiers are terpene phenolic resins such as SP-560 resin available from Schenectedy Chemical Co. and hydrocarbon resins such as Arkon P115 resin available from Arakawa Company (Japan). The tackifier could also be selected from phenolic resins, and plasticizers such as dioctylphthalate (DOP) and dioctylsebacate (DOS). In the present invention, the non-volatile adhesive components and tackifiers can be used alone or in combination of two or more.

The organic solvents in the present invention may be selected from a proper quantity of known solvents which readily volatilize at normal (ambient) temperature, such as n-hexane, n-heptane, methylethylketone, isohexane, methanol, ethanol and Desirable basic materials which readily volatilize at ambient temperatures for use in the present invention, include aminoalcohols such as alkylamines such as ethylamine, diethylamine, methylamine, dimethylamine, triethylamine; ethyleneamines such as ethyleneamine, diethyleneamine; nitrogen heterocyclic compounds such as morpholine, and ammonia. The selection of the kind and the amount of base material used enables control of the time until fading of the color after spraying. Suitable basic materials which readily volatilize at ambient temperatures, typically have a vapor pressure higher than about 10 mmHg at 20° C.

The acid-base indicators used in the present invention, are colored in basic condition and fade to clear in non-basic condition. Acid-base indicators which are colored on alkali pH side (pH >7) and turn clear on acidic pH side.(i.e., pH <7) are preferable. Typically, the preferred acid-base indicators are colored at pH between about 9 and 10 and turn clear at pH between about 6 and 8. More exactly, the following compounds are recited as preferred acid-base indicators:
dinitrophenol(2,5-dinitrophenol),
heptamethoxy red, p-nitrophenol, pinachrome,
m-nitrophenol, quinolein blue (cyanine),
Ethyl-bis(2,4-dinitrophenyl)-acetate,
p-cresolphthalein, phenolphthalein,
o-cresolphthalein, thymolphthalein,
bromophenol purple, methyl green,
nitroamine, basic fuchsine, crystal violet,
trinitrobenzoic acid, 1,3,5-trinitrobenzene,
acid fuchsine.
With the suitable selection of said acid-base indicators, it is possible to realize any color. Additionally, combinations of two or more indicators may be used.

Preferred spraying agents in the present invention are aerosol agents which include liquified propellants such as dimethylether (DME) and liquid petroleum gas (LPG) and liquified propane, butane and iso-butane, and liquified fluorocarbons and chlorofluorocarbons. Other suitable aerosol agents may be selected from compressed gasses such as carbon dioxide and nitrogen.

The use of a self-fading color adhesive in the present invention enables confirmation of the coating area and weight of the adhesive easily. In addition, because the adhesive turns almost clear after drying, the adhesive can be applied widely in consideration of its external appearance, as compared with conventional colored adhesives. Preferably, the adhesive is filled in a container, such as an aerosol can, so that the adhesive and indicator properties remain preserved for a long time. Therefore, the adhesive in the present invention has a high industrial value.

Further, adhesives within the scope of the present invention may exhibit somewhat different adhesive properties when exposed to basic and non-basic conditions. Utilizing this property, the adhesive can be used both for permanent adhesion and for temporary adhesion. For example, when the adhesive of Example 1 described below is used to adhere paper, the adhesive exhibits a strong adhesion to paper when the paper attached just after spraying the adhesive (i.e. when the adhesive is still colored). In contrast, when the paper is attached after fading of the color, the paper can be exfoliated without damage.

Although the present invention has been described primarily with reference to an aerosol spray, the invention can also be employed by coating the self fading adhesive onto a substrate. In such case, essentially the same formulations can be used but without the spraying agent.

EXAMPLES 1–3

The acrylic polymers, resins, and solvents shown in Tables 1 to 3 were mixed by a stirrer with a high shear dissolver type propeller, and were stirred uniformly to disperse the polymers finely (A). Acid-base indicators were dissolved in acetone completely and basic materials were further added (B). Then, (A) and (B) were mixed and stirred completely to be uniform(C). (C) was introduced into an aerosol can and after insertion of a valve, a spraying agent was filled into the can.

EXAMPLE 4

Polysar S-1018 rubber, which is a styrene butadiene rubber crosslinked with di-vinyl benzene, was passed through a two-roll type rubber mixer three times and then was formed into small chips. The chips were added into N-hexane and cyclohexane and Estergum H was further added. The mixture was stirred by a stirrer with a high shear dissolver type propeller to obtain uniform dispersed product (A). Phenolphthalein was dissolved into ethanol completely and ammonia water and morpholine were further added (B). (A) and (B) were mixed and stirred to be uniform (C). (C) was introduced into an aerosol can and after insertion of a valve, liquid petroleum gas (LPG) and dimethylether (DME) were filled into the can.

The adhesive composites were attached by a spray method on a steel sheet, and the coloring condition was observed with the passage of time. At the same time, said adhesives were sprayed on a steel sheet and canvas was attached thereto. Then the adhesive strength was measured by an 180 degree exfoliation test.

The results and the visible observation results were shown as follows.

TABLE 1

| Composition | Working Example | |
|---|---|---|
| | 1 | 2 |
| Crosslinked isoacrylate 1) acrylic acid copolymer | 6.62% | 6.62% |
| Estergum H hydrogenated 2) rosin ester | 4.12% | 4.12% |
| n-Hexane | 59.25% | 59.25% |
| Acetone | 3.18% | 3.18% |
| Ethylbis (2,4-dinitrophenyl)-acetate | 0.11% | 0.11% |
| Ammonia water, 28% | 0.39% | 0.39% |

TABLE 1-continued

| Composition | Working Example | |
|---|---|---|
| | 1 | 2 |
| Morpholine | 0.10% | 0% |
| DME (spraying agent) | 26.23% | 26.33% |
| | 100.00% | 100.00% |

Notes:
1) As described in U.S. Pat. No. 3,578,622, Example 1.
2) Manufactured by Arakawa Chemical Co.

TABLE 2

| Composition | Working Example 3 |
|---|---|
| Microsphere of isoacrylate acrylic ester polymer 3) | 5.41% |
| i-Hexane | 20.08% |
| Acetone | 17.48% |
| Ethyl acetate | 1.34% |
| Ethylbis(2,4-dinitrophenyl)-acetate | 0.17% |
| Ammonia water, aq 28% | 0.55% |
| Morpholine | 0.42% |
| i-Butane (spraying agent) | 54.55% |
| | 100.00% |

Notes: 3) As described in U.S. Pat. No. 4,994,322, Table 2, Example 2.

TABLE 3

| Composition | Working Example 4 |
|---|---|
| Polysar S-1018, 4) Partial crosslinked SBR | 9.63% |
| Estergum H, hydrogenated 2) rosin ester | 14.64% |
| n-Hexane | 32.34% |
| Cyclohexane | 10.81% |
| Ethanol | 1.68% |
| Phenolphthalein | 0.12% |
| Ammonia water, aq 28% | 0.79% |
| Morpholine | 0.39% |
| LPG (spraying agent) | 19.73% |
| DME (spraying agent) | 9.87% |
| | 100.00% |

Notes:
2) Manufactured by Arakawa Chemical Co.
4) Manufactured by the Canada based Polysar Co.

TABLE 4

| Composition | Working Example | | | |
|---|---|---|---|---|
| | 1 | 2 | 3 | 4 |
| Color of adhesive in spraying | blue | blue | blue | pink |
| Color after drying | white or clear | white or clear | white or clear | slightly brown |
| Time until turning clear (minute) | 5 | 0.5 | 10 | 1 |
| Adhesive strength (kg/25 mm) canvas/steel 180 degree exfoliation | 0.6 | 0.6 | 0.3 | 2.2 |

We claim:

1. A sprayable, self-fading color adhesive comprising the following four components:
   a) clear or slightly colored adhesive dissolved in an organic solvent,
   b) basic material which readily volatilizes at ambient temperatures,
   c) acid-base indicator which is colored in a basic environment and fades to clear upon drying, and
   (d) spraying agent.

2. An adhesive according to claim 1 wherein said basic material is selected from the group consisting of aminoalcohols, alkylamines, ethyleneamines, nitrogen-containing heterocyclic compounds, and ammonia.

3. An adhesive according to claim 1 wherein said basic material has a vapor pressure higher than about 10 mmHg at 20° C.

4. An adhesive according to claim 1 wherein said acid-base indicator is selected from the group consisting of: dinitrophenol(2,5-dinitrophenol),
heptamethoxy red, p-nitrophenol, pinachrome,
m-nitrophenol, quinolein blue (cyanine),
Ethyl-bis(2,4-dinitrophenyl)-acetate,
p-cresolphthalein, phenolphthalein,
o-cresolphthalein, thymolphthalein,
bromophenol purple, methyl green,
nitroamine, basic fuchsine, crystal violet,
trinitrobenzoic acid, 1,3,5-trinitrobenzene,
and acid fuchsine.

5. A process for indicating the presence of an adhesive on a substrate comprising the steps of:
   (a) providing: a sprayable, self-fading color adhesive comprising the following four components:
      (i) clear or slightly colored adhesive dissolved in an organic solvent,
      (ii) basic material which readily volatilizes at ambient temperatures,
      (iii) acid-base indicator which is colored in a basic environment and fades to clear upon drying, and
      (iv) spraying agent;
   (b) spraying said adhesive onto a substrate to provide a colored layer of adhesive; and
   (c) allowing the adhesive to dry whereupon the color of the adhesive subsequently fades.

\* \* \* \* \*

UNITED STATES PATENT AND TRADEMARK OFFICE
CERTIFICATE OF CORRECTION

PATENT NO.: 5,480,925

DATED: January 2, 1996

INVENTOR(S): Hisao Masuzaki and Shinji Sugii

It is certified that error appears in the above-identified patent and that said Letters Patent is hereby corrected as shown below:

Column 2, line 17, after "and" add --iso-propanol.--

Column 2, lines 20-24, delete "alkylamines such as ethylamine, diethylamine, methylamine, dimethylamine, triethylamine; ethyleneamines such as ethyleneamine, diethyleneamine; nitrogen heterocyclic compounds such as morpholine, and ammonia." and insert --monoethanolamine, N,N-dimenthylethanolamine; alkylamines such as ethylamine, diethylamine, triethylamine, isopropylamine, diisopropylamine, methylamine, dimethylamine, triethylamine; ethyleneamines such as ethyleneamine, diethyleneamine; nitrogen heterocyclic compounds such as morpholine, pyridine, pyrazine, piperazine, piperidine, picolines; and ammonia.--

Signed and Sealed this

Ninth Day of July, 1996

Attest:

BRUCE LEHMAN

*Attesting Officer*     *Commissioner of Patents and Trademarks*